(12) United States Patent
Schneider

(10) Patent No.: US 8,195,949 B2
(45) Date of Patent: Jun. 5, 2012

(54) MECHANISM FOR GENERATING MESSAGE SEQUENCE ORDER NUMBERS

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 750 days.

(21) Appl. No.: 12/074,092

(22) Filed: Feb. 29, 2008

(65) Prior Publication Data

US 2009/0222666 A1 Sep. 3, 2009

(51) Int. Cl.
*H04L 29/06* (2006.01)
(52) U.S. Cl. ........................................ 713/181; 713/168
(58) Field of Classification Search .................. 713/168, 713/181
See application file for complete search history.

(56) References Cited

U.S. PATENT DOCUMENTS

| | | | |
|---|---|---|---|
| 5,500,897 A | 3/1996 | Hartman | |
| 6,021,203 A | 2/2000 | Douceur et al. | |
| 6,343,281 B1 | 1/2002 | Kato | |
| 6,449,473 B1 * | 9/2002 | Raivisto | 455/410 |
| 6,907,473 B2 | 6/2005 | Schmidt et al. | |
| 7,234,059 B1 * | 6/2007 | Beaver et al. | 713/170 |
| 7,330,838 B2 | 2/2008 | Rogers et al. | |
| 7,770,032 B2 | 8/2010 | Nesta et al. | |
| 7,848,517 B2 | 12/2010 | Britz et al. | |
| 7,992,006 B2 | 8/2011 | She | |
| 2003/0005284 A1 * | 1/2003 | Euchner | 713/152 |
| 2003/0126091 A1 | 7/2003 | Rogers et al. | |
| 2004/0003116 A1 | 1/2004 | Munger et al. | |
| 2004/0015999 A1 | 1/2004 | Carlucci et al. | |
| 2004/0098485 A1 | 5/2004 | Larson et al. | |
| 2004/0107285 A1 | 6/2004 | Larson et al. | |
| 2004/0107286 A1 | 6/2004 | Larson et al. | |
| 2005/0097569 A1 | 5/2005 | Chandrasekaran | |
| 2006/0123134 A1 | 6/2006 | Munger et al. | |
| 2006/0209766 A1 | 9/2006 | Britz et al. | |
| 2006/0274856 A1 | 12/2006 | Dunn et al. | |
| 2007/0237145 A1 * | 10/2007 | Adhikari et al. | 370/392 |
| 2007/0260879 A1 | 11/2007 | Dzung | |
| 2007/0288768 A1 | 12/2007 | Nesta et al. | |
| 2008/0022174 A1 | 1/2008 | Bancel et al. | |
| 2008/0040791 A1 | 2/2008 | Munger et al. | |
| 2008/0040792 A1 | 2/2008 | Larson et al. | |
| 2008/0209214 A1 | 8/2008 | Schrijen et al. | |
| 2008/0216168 A1 | 9/2008 | Larson et al. | |
| 2009/0044025 A1 | 2/2009 | She | |

OTHER PUBLICATIONS

Office Action for U.S. Appl. No. 12/074,006, mailed Mar. 22, 2011.
RSA Laboratories. "What is Diffie Hellman?" www.rsa.com/rsalabs/node.asp?=2248 (May 6, 2007) from Internet Archive Wayback Machine pp. 1-2.
Red Hat, Inc. Office Action for U.S. Appl. No. 12/074,034 mailed Nov. 21, 2011.
Red Hat, Inc. Final Office Action for U.S. Appl. No. 12/074,006 mailed Jul. 13, 2011.
Red Hat, Inc. Advisory Action for U.S. Appl. No. 12/074,006 mailed Sep. 27, 2011.

* cited by examiner

*Primary Examiner* — Nasser Goodarzi
*Assistant Examiner* — Lisa Lewis
(74) *Attorney, Agent, or Firm* — Lowenstein Sandler PC

(57) ABSTRACT

In one embodiment, a mechanism for generating message sequence order numbers is disclosed. In one embodiment, a method includes generating a timestamp value, and calculating a message authentication code (MAC) using as inputs the timestamp value, public information of an intended recipient, and a shared secret key kept between a broadcaster and the intended recipient. In addition, the method includes extracting, according to a pre-determined process agreed to between the broadcaster and the intended recipient, a required number of bits that define a size of an initial sequence number from the MAC. Lastly, the method includes using the extracted result as the initial sequence number.

23 Claims, 5 Drawing Sheets

MECHANISM FOR GENERATING MESSAGE SEQUENCE ORDER NUMBERS

TECHNICAL FIELD

The embodiments of the invention relate generally to data communications and, more specifically, relate to generating message sequence order numbers in data communications.

BACKGROUND

Data communications suffer from the weakness of intentional invasion by snoopers and other third-party interlopers. Even in cases where data communications are encrypted using some secure mechanism, such as Secure Sockets Layer (SSL), it is still possible for traffic analysis to be conducted where, both endpoints of the communication and how much traffic is passed between them may be determined. This is information that the endpoints may not have wanted to be public. In addition, some data communications may operate in environments where certain types of cryptography and ciphering are not a legal alternative for implementation.

Some conventional techniques for protection of broadcast data communication schemes generally present a few problems with data security. One problem is that the end points of the data communication cannot reliably authenticate who they are speaking with. Another problem is that information within the data communication may be disclosed to parties who the endpoints do not want to see the information.

In addition, conventional techniques for protection of broadcast data communication schemes do not provide for the secure ordering of sequences of messages sent in a randomized order. As a result, any third-party eavesdropper may find out who was supposed to receive which messages and in what order the messages were supposed to be sent. This is especially the case in those broadcast channels where export controls and legal restrictions on cryptographic software exist. Similarly, conventional techniques for protection of broadcast data communications typically have the problem that a broadcaster cannot guarantee that an intended recipient actually receives and processes the messages in a particular sequence in which the broadcaster intended the recipient to receive the messages. In light of the above problems, a way to ensure that broadcast of data communications falling under a sequenced order are not vulnerable to traffic analysis would be beneficial.

In addition, such a solution calls for the reliable and anonymous generation of the initial sequence number and thereby following sequence numbers. A solution that allows for the generation and communication of sequence numbers without having to publish what the initial sequence number (and thereby the following sequence numbers) are without having to reuse the same sequence would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
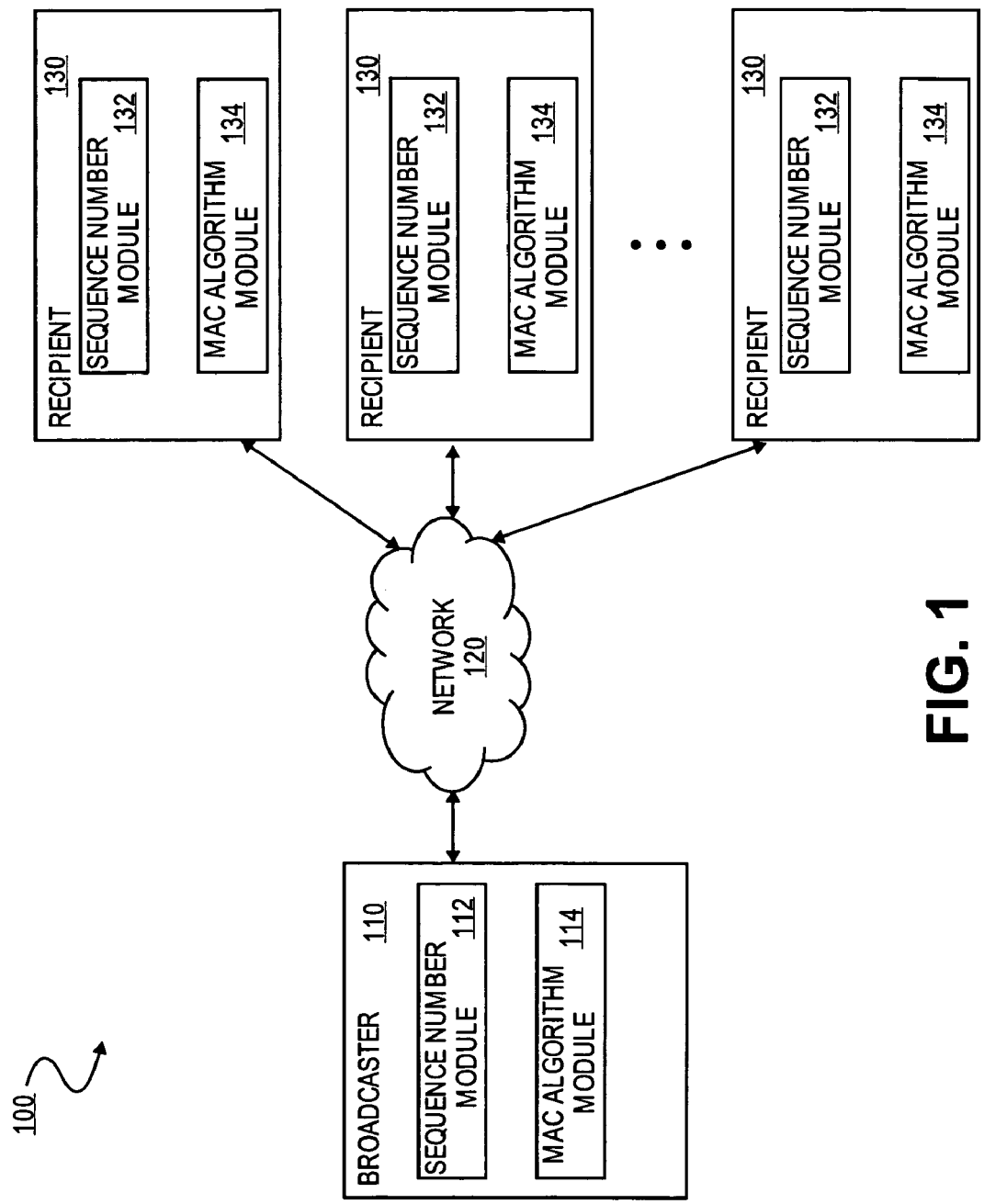
FIG. 1 is a block diagram of an exemplary network architecture in which embodiments of the invention may be implemented.

Embodiments of the invention provide for generating message sequence order numbers. In one embodiment, a method for generating message sequence order numbers includes generating a timestamp value, and calculating a message authentication code (MAC) using as inputs the timestamp value, public information of an intended recipient, and a shared secret key kept between a broadcaster and the intended recipient. In addition, the method includes extracting, according to a pre-determined process agreed to between the broadcaster and the intended recipient, a required number of bits that define a size of an initial sequence number from the MAC. Lastly, the method includes using the extracted result as the initial sequence number.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate, physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 is a block diagram of an exemplary network architecture in which embodiments of the invention may be implemented. The network architecture system 100 includes a broadcaster 110 and a plurality of recipients 130 coupled by a network 120. Network 120 may be a public network (e.g., Internet) or a private network (e.g., Ethernet or a Local Area Network (LAN)). In one embodiment, each of the broadcaster 110 and recipients 130 is a computing system that engages in data communications. In some embodiments, broadcaster 110 sends out multicast or simulcast communications to each of the recipients 130 at the same time. In other embodiments, broadcaster 110 may communicate with recipients 130 in a unicast fashion. In yet other embodiments, broadcaster 110 and recipients 130 may be participating in a peer-to-peer data communication arrangement.

In addition, broadcaster 110 includes a sequence number module 112 and message authentication code (MAC) algorithm module 114, while each recipient 130 also includes a sequence number module 132 and message authentication code (MAC) algorithm module 134. These modules 112, 114, 132, 134 may be used in conjunction to enable broadcaster 110 and recipients 130 to generate sequence numbers for data communications in a reliable, yet anonymous, fashion. The sequence numbers may be utilized by the broadcaster 110 and recipients 130 to send fragmented messages of an overall transmission in an anonymous and secure fashion. In particular, the broadcaster 110 may set up sequence numbers between the broadcaster and the one or more recipients 130 without having to publish what the initial sequence number (and thereby the following sequence numbers) is and without having to reuse the same sequence.

Embodiments of the invention depend on the cooperating parties to the transaction having a shared secret key, having public published information about the other parties, and each party having a secure time base that is not necessarily shared. Embodiments of the invention further utilize message authentication codes (MACs) to enable the secure, reliable, and anonymous creation and communication of the sequence numbers.

Figure 2:
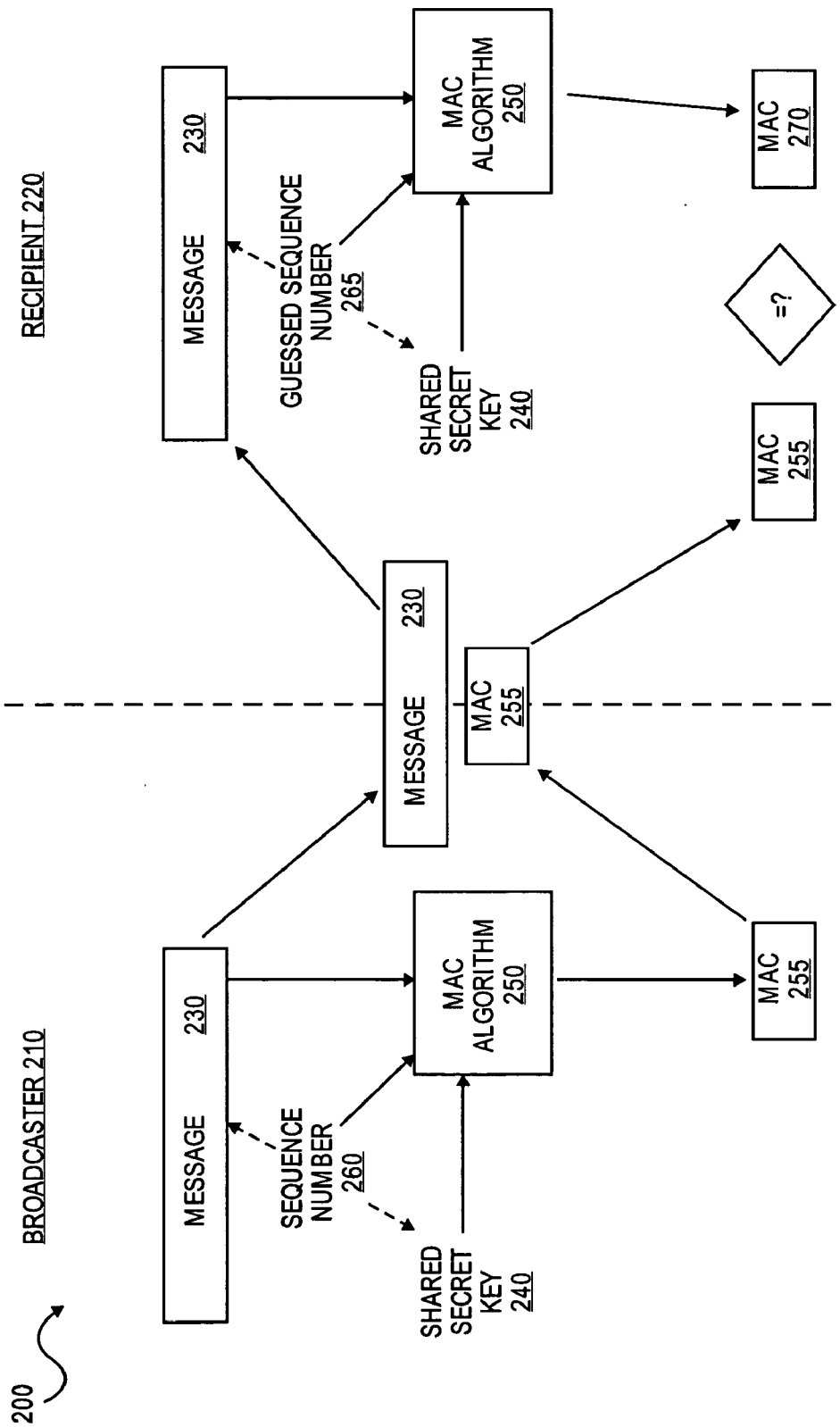
FIG. 2 is a block diagram depicting the utilization of sequence numbers between broadcaster and recipient according to embodiments of the invention.

FIG. 2 is a block diagram depicting one exemplary approach to utilize sequence numbers between a broadcaster and recipient according to embodiments of the invention. System 200 depicts a communication between broadcaster 210 and recipient 220. In one embodiment, broadcaster 210 may be the same as broadcaster 110 and recipient 220 may be the same as recipient 130, as described above with respect to FIG. 1. In one embodiment, broadcaster 210 is sending a message 230 to recipient 220. Message 230 is part of a sequence of messages of an overall transmission being sent to recipient 220. The overall transmission may be broken up into smaller sequence messages due to a variety of reasons, such as communication protocol size requirements, efficiency of communication, security, etc. Each message is assigned a unique sequence number that will be utilized on the receiving end to re-order the messages into the overall transmission.

Broadcaster 210 creates a MAC 255 by plugging a variety of inputs into MAC algorithm 250. In one embodiment, the MAC algorithm modules 114 and 134 of FIG. 1 may be utilized to perform this function. As illustrated, the inputs into the MAC algorithm 250 include the message itself 230, a shared secret key 240, and the unique sequence number 260 assigned to the message. In some embodiments, the MAC algorithm 250 is an algorithm previously agreed upon between the broadcaster 210 and recipient 220. The shared secret key 240 is a public-private key pair such that the private key of one actor and the public key of another can be combined to create a key the two actors will share. This shared secret key is unique between the broadcaster/recipient pair and is only known by the pair.

In one embodiment, the shared secret key is created using a Diffie Hellman key exchange protocol. The Diffie Hellman key exchange protocol is a cryptographic protocol that allows two parties that have no prior knowledge of each other to jointly establish a shared secret key over an insecure communications channel. This key can then be used to encrypt subsequent communications using a symmetric key cipher. One skilled in the art should have knowledge of how to establish a shared secret key using Diffie Hellman key exchange protocol. In other embodiments, other cryptographic protocols may be utilized to establish a shared secret key.

The message 230 and MAC 255 are then sent to the recipient 220. The recipient 220 guesses the sequence number 265 of the message 230 (based upon a previously-agreed upon initial sequence number and sequence order scheme). This guessed sequence number 265 is incorporated with the message 230 and shared secret key 240 as inputs into MAC algorithm 250 to create a MAC 270. The recipient 220 compares this MAC 270 with the MAC 255 sent with the message 230 to determine if there is a match. If so, then the recipient 220 is the intended recipient of the message 230 and the guessed sequence number 265 is the correct sequence number for the message 230. If there is not a match, then the recipient should iteratively step through the possible sequence numbers 265 in creating MAC 270 until either a match is found or the possible sequence numbers are exhausted.

In some embodiments, a message may be sent to multiple recipients in a simultaneous fashion. In addition, the broadcaster 210 has the option of including multiple pseudo-MACs with the message 230 and sending multiple bogus messages with pseudo-MACs to the recipient 220. As a result, the broadcaster 210 can send messages in such a way that, in addition to not being authenticated by anybody but the intended recipient 220, the messages are no longer readable by anybody but the intended recipient 220 because they are sent in a random order so that no one but the intended recipient 220 would be able to put them back into order.

The scheme as illustrated in FIG. 2 is repeated for each of the messages in the sequence of the overall transaction (which may be sent in a random order). In this way, at the end of all of the broadcasting, the recipient 220 will be able to put the received messages intended for the recipient back into order to determine the message of the overall transaction. In order for the illustrated approach of utilizing sequence numbers to be successful, the broadcaster 210 should have a system for creating and communicating an initial sequence number to the intended recipient(s) in a reliable and anonymous fashion. Embodiments of the invention described below provide a means to generate an initial sequence number (and thereby the following sequence numbers) with these goals in mind.

Figure 3:
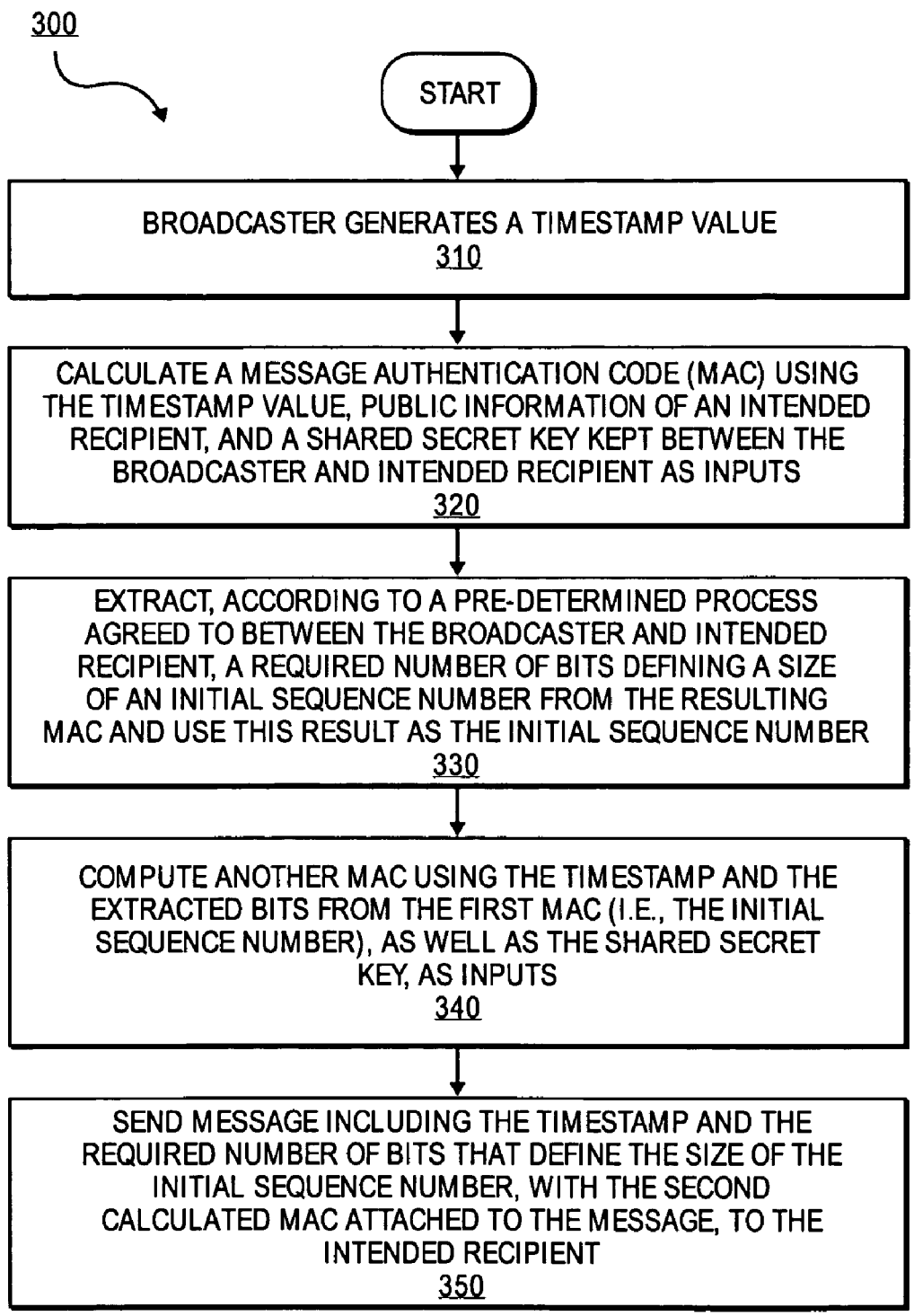
FIG. 3 is a flow diagram depicting one embodiment of a method to generate message sequence order numbers by a broadcaster.

FIG. 3 is a flow diagram depicting a method 300 of generating message sequence order numbers by a broadcaster according to one embodiment of the invention. Method 300 may be performed by processing logic at a broadcaster that may comprise hardware (e.g., circuitry, dedicated logic, programmable logic, microcode, etc.), software (such as instructions run on a processing device), or a combination thereof. In one embodiment, method 300 is performed by the sequence number module 112 of FIG. 1. In one embodiment, the broadcaster of method 300 may be broadcaster 110 or broadcaster 210 communicating with recipient 130 or recipient 220 over a network 130, as described with respect to FIGS. 1 and/or 2.

Method 300 begins at block 310 where the broadcaster generates a timestamp value. This timestamp value may be an integer value that specifies the number of seconds or microseconds since a particular event (e.g., such as the typical event in many computing systems of midnight of Jan. 1, 1970).

Then, at block 320, the broadcaster calculates a message authentication code (MAC) using as inputs the timestamp value, public information of the intended recipient, and a shared secret key kept between the broadcaster and the intended recipient. In some embodiments, the public information of the recipient is a public key, such as the public key utilized to create the shared secret key in the Diffie Hellman key exchange protocol.

At block 330, the broadcaster then extracts a required number of bits defining a size of an initial sequence number from the resulting MAC and uses this result as the initial sequence number between the broadcaster and the recipient. In one embodiment, the required number of bits that define the size of the initial sequence number is a pre-determined number agreed to between the broadcaster and the intended recipient.

The extraction takes place according to a pre-determined process agreed to between the broadcaster and recipient. Such a process may include extracting the required number of bits from the beginning of the MAC, extracting the required number of bits from the end of the MAC, extracting some subset equal to the required number of bits from the middle of the MAC, or performing some function on the MAC that results in the required number of bits. For example, if a broadcaster is generating 64 bit sequence numbers and is operating under a construct that produces 256 bit MACs, then the broadcaster could extract the 64 bit subset directly from the 256 bit MAC (e.g., from the beginning, end, or middle). In addition, the broadcaster may perform a function on the MAC to produce the 64 bit result, such as dividing the 256 MAC into four 64 bit words and adding them together. One skilled in the art will appreciate that there are a variety of techniques to extract the requisite bits from the MAC to produce the initial sequence number.

At block 340, the broadcaster computes a second MAC using the timestamp value, the extracted bits from the first MAC (i.e., the initial sequence number), and the shared secret key as inputs. Then, at block 350, the broadcaster sends a message to the intended recipient including the timestamp value and the required number of bits that define the size of the initial sequence number. In addition, the broadcaster attaches the second calculated MAC to the message.

Figure 4:
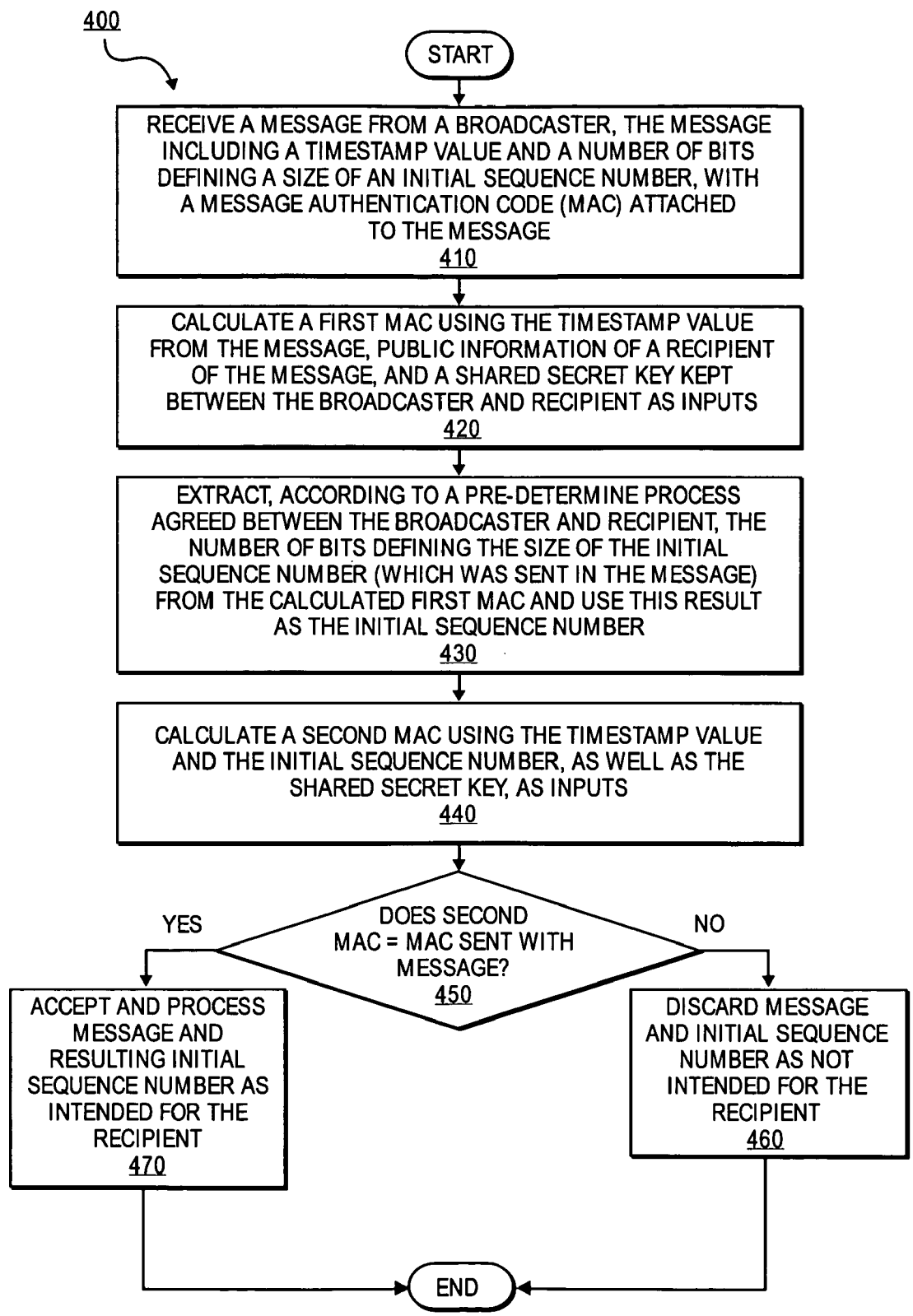
FIG. 4 is a flow diagram depicting one embodiment of a method to generate message sequence order numbers by a recipient.

FIG. 4 is a flow diagram depicting a method 400 of generating message sequence order numbers by a recipient according to one embodiment of the invention. Method 400 may be performed by processing logic at a broadcaster that may comprise hardware (e.g., circuitry, dedicated logic, programmable logic, microcode, etc.), software (such as instructions run on a processing device), or a combination thereof. In one embodiment, method 400 is performed by the sequence number module 132 of FIG. 1. In one embodiment, the recipient of method 400 may be recipient 130 or recipient 220 communicating with broadcaster 110 or broadcaster 210 over network 130, as described with respect to FIGS. 1 and/or 2.

Method 400 begins at block 410 where the recipient receives a message from the broadcaster, the message including a timestamp value and a required number of bits defining a size of an initial sequence number. In addition, a MAC is attached to the message.

Then, at block 420, the recipient calculates a first MAC using as inputs the timestamp value from the message, public information (e.g., a public key) of the recipient of the message, and a shared secret key kept between the recipient and the broadcaster. The public information and shared secret key are similar to those discussed above with respect to FIG. 3. At block 430 the recipient extracts the required number of bits (sent with the original message) from the calculated first MAC and uses this extracted result as the initial sequence number. In one embodiment, the extraction is performed according to a pre-determined process agreed to between the recipient and the broadcaster. Possible implementations of such an extraction process are described above with respect to FIG. 3.

Then, at block 440, the recipient calculates a second MAC using as inputs the timestamp value and the extracted initial sequence number, as well as the shared secret key. At decision block 450, the recipient determines whether the second MAC matches the MAC sent with the message. In some embodiments, the message may also include one or more pseudo-MACs and other MACs created for other recipients. The recipient should compare the second MAC against all of these other MACs for a match. If there is not match, then at block 460, the recipient should discard the message (and attached MAC) and initial sequence number as not intended for the recipient. However, if there is a match, then the method 400 proceeds to block 470 where the recipient accepts and processes the message (and attached MAC) and the resulting initial sequence number as intended for the recipient.

In one embodiment, once the initial sequence number has been established between the broadcaster and recipient, they should be able to agree to a system for incrementing the sequence numbers, whether that system is one of linearly increasing the sequence numbers or a system of applying a function to the sequence numbers to create the next sequence number, for example. One skilled in the art will appreciate the variety of techniques that may be utilized to step through the sequence. As a result, the broadcaster and recipient are able to securely and anonymously initialize and communicate a sequence between each other without having to publish what the initial sequence number (and thereby the following sequence numbers) is and without having to reuse the same sequence.

Figure 5:
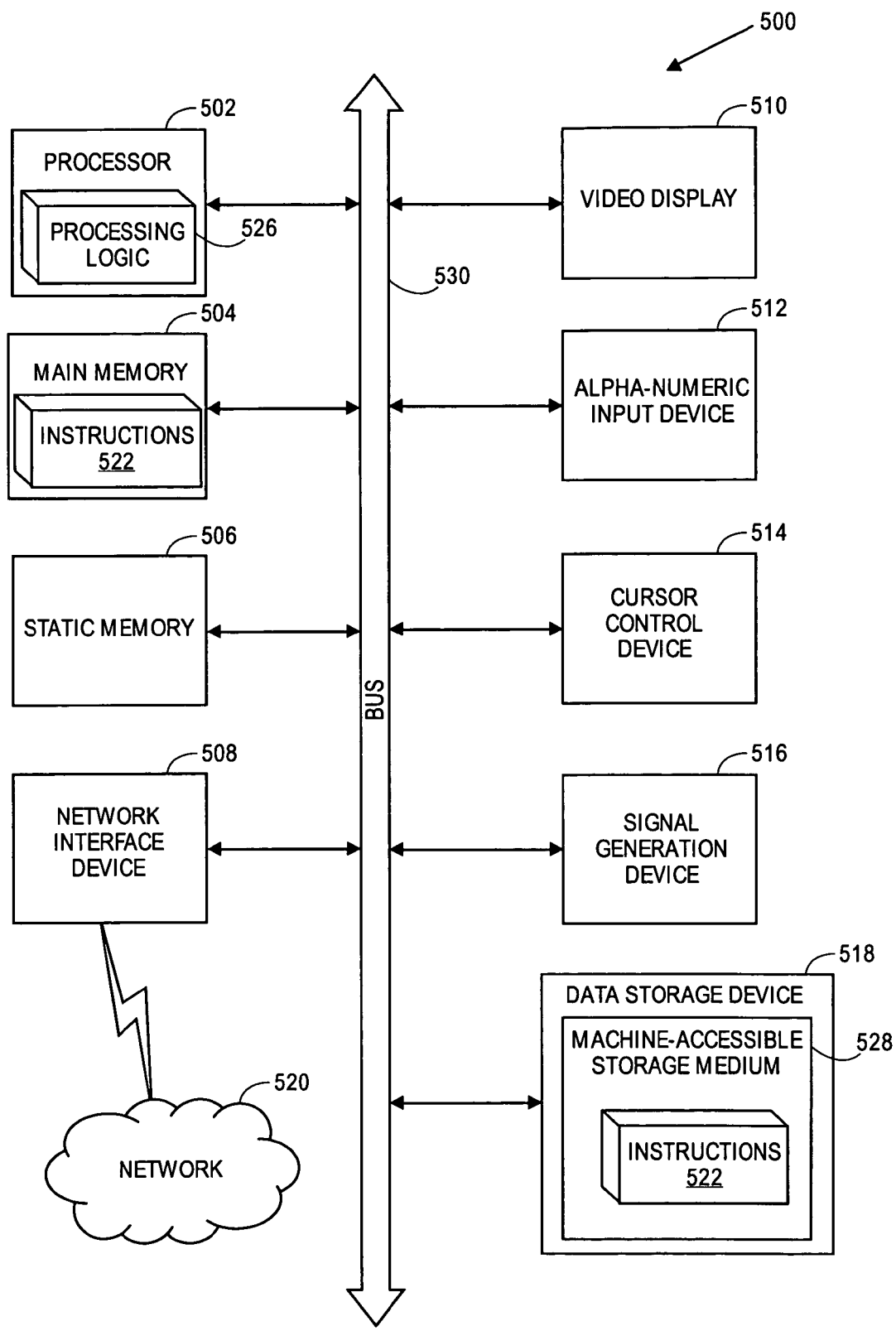
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an internet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

In some embodiments, main memory 504, static memory 506, and/or data storage device 518 may be utilized to store public information, such as a public key, of either of the broadcaster or recipient as described above with respect to various embodiments of the invention.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528 on which is stored one or more set of instructions (e.g., software 522) embodying any one or more of the methodologies of functions described herein. The software 522 may also reside, completely or at least partially, within the main memory 504 and/or within the processing device 502 during execution thereof by the computer system 500; the main memory 504 and the processing device 502 also constituting machine-accessible storage media. The software 522 may further be transmitted or received over a network 520 via the network interface device 508. In one embodiment, the network interface device 508 is operable to receive messages from either the broadcaster or the recipient described above in various embodiments of the invention.

The machine-readable storage medium 528 may also be used to store broadcast sequence number logic and/or recipient sequence number logic (e.g., sequence number modules 112, 132 of FIG. 1), and/or a software library containing methods that call the above applications. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method, comprising:

generating, by a computing machine, a timestamp value;

calculating, by the computing machine, a first message authentication code (MAC) using the timestamp value, public information of a recipient of a sequences of messages, and a shared secret key;

extracting, by the computing machine, according to a process agreed to between the computing machine and the recipient, a number of bits from the first MAC equal to a size of an initial sequence number of the sequence of messages;

using, by the computing machine, the extracted bits as an applied initial sequence number for the sequence of messages;

calculating, by the computing machine, a second MAC using the timestamp value, the applied initial sequence number, and the shared secret key; and sending, by the computing machine, a message of the sequence of messages and the second MAC together to the recipient, the message further comprising the timestamp value and the number of bits extracted from the first MAC.

2. The method of claim 1, wherein the sending the message with the another MAC further includes:

creating a plurality of pseudo-MACs with an identical format to the first MAC;

attaching at one or more of the plurality of pseudo-MACs to the message; and sending to the recipient a plurality of bogus messages with one or more of the plurality of pseudo-MACs attached to the bogus messages.

3. The method of claim 1, wherein the process agreed to between the computing machine and the recipient includes extracting the number of bits from at least one of the beginning of the first MAC, the end of the first MAC, or the middle of the first MAC.

4. The method of claim 1, wherein the process agreed to between the computing machine and the recipient includes performing a function on the first MAC that creates a result having the number of bits.

5. The method of claim 1, wherein the shared secret key is a unique key kept between the recipient and the computing machine and is based on a Diffie Hellman key exchange protocol.

6. The method of claim 1, wherein the public information of the recipient is a public key.

7. The method of claim 1, wherein a value of the number of bits is agreed to between the computing machine and the recipient prior to the calculating the first MAC.

8. A computer-implemented method, comprising:
receiving, by a computing machine, a message of sequence of messages from a broadcaster with a first message authentication code (MAC) attached to the message, the message including a timestamp value and numerical value defining a size of an initial sequence number of the sequence of messages;
calculating, by the computing machine, a second MAC using the timestamp value, public information of the computing machine, and a shared secret key;
extracting, by the computing machine, according to a process agreed to between the recipient and the broadcaster, a number of bits equal to the numerical value from the second MAC;
using, by the computing machine, the extracted bits as the initial sequence number;
calculating, by the computing machine, a third MAC using the timestamp value from the message, the initial sequence number, and the shared secret key; and
if the first and third MACs match, accepting, by the computing machine, the message, the attached first MAC, and the initial sequence number as intended for the computing machine.

9. The method of claim 8, further comprising:
if the first and third MACs do not match, then discarding the message, the attached first MAC, and the initial sequence number as not intended for the computing machine.

10. The method of claim 8, wherein the process agreed to between the computing machine and the broadcaster includes extracting the number of bits from at least one of the beginning of the second MAC, the end of the second MAC, or the middle of the second MAC.

11. The method of claim 8, wherein the process agreed to between the broadcaster and the computing machine includes performing a function on the second MAC that creates a result having a size equal to the number of bits.

12. The method of claim 8, wherein the shared secret key is a unique key kept between the computing machine and the broadcaster and is based on a Diffie Hellman key exchange protocol.

13. The method of claim 8, wherein the public information of the computing machine is a public key.

14. The method of claim 8, wherein the value of the number of bits is agreed to between the broadcaster and the computing machine prior to the calculating the first MAC.

15. A non-transitory machine-readable storage medium including data that, when accessed by a machine, cause the machine to perform operations comprising:
generating, by a computing machine, a timestamp value;
calculating, by the computing machine, a first message authentication code (MAC) using the timestamp value, public information of a recipient of a sequences of messages, and a shared secret key;
extracting, by the computing machine, according to a process agreed to between the computing machine and the recipient, a number of bits from the first MAC equal to a size of an initial sequence number of the sequence of messages;
using, by the computing machine, the extracted bits as an applied initial sequence number for the sequence of messages;
calculating, by the computing machine, a second MAC using the timestamp value, the applied initial sequence number, and the shared secret key; and
sending, by the computing machine, a message of the sequence of messages and the second MAC together to the recipient, the message further comprising the timestamp value and the number of bits extracted from the first MAC.

16. The non-transitory machine-readable storage medium of claim 15, wherein the process agreed to between the computing machine and the recipient includes extracting the number of bits of the initial sequence number from at least one of the beginning of the first MAC, the end of the first MAC, or the middle of the first MAC.

17. The non-transitory machine-readable storage medium of claim 15, wherein the process agreed to between the computing machine and the recipient includes performing a function on the first MAC that creates a result equal to the number of bits of the initial sequence number.

18. The non-transitory machine-readable storage medium of claim 15, wherein the shared secret key is a unique key kept between the recipient and the computing machine and is based on a Diffie Hellman key exchange protocol.

19. An apparatus, comprising:
a network device in communication with a network, the network device configured to receive a message of a sequence of messages from a broadcaster with a first message authentication code (MAC) attached to the message, the message including a timestamp value and a numerical value defining a size of an initial sequence number of the sequence of messages,
a memory device coupled to the network device configured to store public information of the apparatus and a shared secret key;
a MAC algorithm module coupled to the network device and the memory device which, when executed, calculates a second MAC using the timestamp value, the public information, and the shared secret key; and
a sequence number module communicably coupled to the network device and the memory device which, when executed:
extracts, according to a process agreed to with the broadcaster, a number of bits equal to the numerical value from the second MAC; and
uses the extracted bits as the initial sequence number;
wherein the MAC algorithm module calculates a third MAC using the timestamp value from the message, the initial sequence number, and the shared secret key; and wherein the message, the attached first MAC, and the initial sequence number are accepted by the apparatus as intended for the apparatus when the first and third MACs match.

20. The apparatus of claim 19, wherein if the first and third MACs do not match, the message, the attached first MAC, and the initial sequence number are discarded as not intended for the apparatus.

21. The apparatus of claim 19, wherein the process agreed to with the broadcaster comprises extracting the number of bits from at least one of the beginning of the second MAC, the end of the second MAC, or the middle of the second MAC.

22. The apparatus of claim 19, wherein the process agreed to with the broadcaster comprises performing a function on the second MAC that creates a result having a size equal to the number of bits.

23. The apparatus of claim 19, wherein the shared secret key is a unique key and is based on a Diffie Hellman key exchange protocol.

* * * * *